(12) United States Patent
Takagi

(10) Patent No.: US 8,970,736 B2
(45) Date of Patent: Mar. 3, 2015

(54) DIGITAL CAMERA

(75) Inventor: Morihiro Takagi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/561,872

(22) Filed: Jul. 30, 2012

(65) Prior Publication Data

US 2012/0287306 A1    Nov. 15, 2012

Related U.S. Application Data

(63) Continuation of application No. 12/926,765, filed on Dec. 8, 2010, now abandoned, which is a continuation of application No. 11/878,879, filed on Jul. 27, 2007, now abandoned.

(30) Foreign Application Priority Data

Aug. 4, 2006   (JP) .................................. 2006-213439

(51) Int. Cl.
| | |
|---|---|
| *H04N 5/76* | (2006.01) |
| *H04N 5/77* | (2006.01) |
| *H04N 1/00* | (2006.01) |
| *H04N 1/21* | (2006.01) |
| *H04N 5/445* | (2011.01) |
| *H04N 5/907* | (2006.01) |
| *H04N 9/82* | (2006.01) |

(Continued)

(52) U.S. Cl.
CPC ........... *H04N 5/772* (2013.01); *H04N 1/00458* (2013.01); *H04N 1/2112* (2013.01); *H04N 1/2158* (2013.01); *H04N 5/44543* (2013.01); *H04N 5/907* (2013.01); *H04N 9/8205* (2013.01); *H04N 21/47* (2013.01); *H04N 2101/00* (2013.01); *H04N 2201/0084* (2013.01); *H04N 2201/3242* (2013.01); *H04N 2201/3252* (2013.01); *H04N 2201/3273* (2013.01)
USPC .................. 348/231.99; 348/211.5; 348/211.6

(58) Field of Classification Search
USPC .............................. 348/231.99, 231.7, 333.05
See application file for complete search history.

(56) References Cited

U.S. PATENT DOCUMENTS

| | | | | |
|---|---|---|---|---|
| 6,614,996 | B2 | 9/2003 | Okisu et al. | |
| 6,650,365 | B1 * | 11/2003 | Sato | ........................... 348/231.3 |
| 6,750,890 | B1 * | 6/2004 | Sugimoto | ..................... 715/838 |

(Continued)

FOREIGN PATENT DOCUMENTS

| | | |
|---|---|---|
| JP | A-10-285541 | 10/1998 |
| JP | A-11-234604 | 8/1999 |

(Continued)

OTHER PUBLICATIONS

Dec. 21, 2010 Office Action issued in Japanese Patent Application No. 2006-213439 (with Translation).

*Primary Examiner* — Roberto Velez
*Assistant Examiner* — Yih-Sien Kao
(74) *Attorney, Agent, or Firm* — Oliff PLC

(57) ABSTRACT

A digital camera, which photographs a subject, generates image data, and records the image data on a recording medium, includes: an image processing device that performs a plurality of image processing to the recorded image data, in response to a user's operation; a history creating device that creates, for each image data, history information that indicates a history of image processing performed by the image processing device; and a display unit that displays the history information thus created.

9 Claims, 9 Drawing Sheets

IMAGE 1

IMAGE 2

IMAGE 3

IMAGE 4

IMAGE 5

(51) Int. Cl.
*H04N 21/47* (2011.01)
*H04N 101/00* (2006.01)

(56) References Cited

U.S. PATENT DOCUMENTS

| | | | |
|---|---|---|---|
| 6,834,130 B1* | 12/2004 | Niikawa et al. | 382/305 |
| 7,151,564 B2 | 12/2006 | Kubo | |
| 2002/0063782 A1* | 5/2002 | Saito | 348/231 |
| 2004/0252217 A1 | 12/2004 | Battles et al. | |
| 2006/0109500 A1 | 5/2006 | Morita et al. | |

FOREIGN PATENT DOCUMENTS

| | | |
|---|---|---|
| JP | A-2001-034775 | 2/2001 |
| JP | A-2001-169174 | 6/2001 |
| JP | A-2001-309296 | 11/2001 |
| JP | A-2002-271671 | 9/2002 |
| JP | A-2007-221723 | 8/2007 |

* cited by examiner

DIGITAL CAMERA

This is a Continuation of application Ser. No. 12/926,765, filed Dec. 8, 2010 which in turn is a Continuation of application Ser. No. 11/878,879 filed Jul. 27, 2007. The disclosure of the prior applications is hereby incorporated by reference herein in its entirety.

INCORPORATION BY REFERENCE

The disclosure of the following priority application is herein incorporated by reference:

Japanese Patent Application No. 2006-213439 filed Aug. 4, 2006

BACKGROUND OF THE INVENTION

1. Field of the Invention

A present invention relates to a digital camera with which image processing can be performed to photographed image data.

2. Description of Related Art Japanese Laid Open Patent Publication No. 2001-169174 discloses a digital camera with which photographed (recorded) image data is re-recordable after it is read out from a memory card to be subjected to image processing such as a sharpness process, a contrast control, a chroma control, etc.

SUMMARY OF THE INVENTION

A digital camera, which photographs a subject generates image data, and records the image data on a recording medium, according to a 1st aspect of the present invention includes: an image processing device that performs a plurality of image processing to the recorded image data, in response to a user's operation; a history creating device that creates, for each image data, history information that indicates a history of image processing performed by the image processing device; and a display unit that displays the history information thus created.

According to a 2nd aspect of the present invention, in the digital camera according to the 1st aspect, the display unit may display the history information created with respect to the image data with an image based on the image data.

According to a 3rd aspect of the present invention, in the digital camera according to the 2nd aspect, it is preferable that the display unit displays the history information, superimposing upon the image based on the image data.

According to a 4th aspect of the present invention, in the digital camera according to the 1st aspect, it is preferable that the history information is information that represents a content of image processing performed to the image data, and, in case a plurality of image processing were performed, sequence of the plurality of image processing.

A digital camera, which photographs a subject, generates image data, and records the image data on a recording medium, according to a 5th aspect of the present invention includes: an image processing device that performs image processing to the recorded image data, in response to a user's operation; and a display unit that displays image based on the recorded image data and information related to the image on display, wherein: when displaying the image, in case the image processing has been performed to the image data, information that is indicative of a content of the image processing is displayed, whereas in case the image processing has not been performed, other information or no information is displayed.

According to a 6th aspect of the present invention, it is preferable that the digital camera according to the 5th aspect further includes a display switching device that switches to other information to be displayed or no information to be displayed, under a circumstance that the image based on the image data and the information being indicative of a content of the image processing are displayed on the display unit.

According to a 7th aspect of the present invention, in the digital camera according to the 5th aspect, it is preferable that the image processing device is capable of performing a plurality type of image processing, and the information being indicative of a content of the image processing is a history information that indicates a history of image processing.

A digital camera, which photographs a subject and generates image data according to a 8th aspect of the present invention includes: an image processing device that performs a plurality of image processing to the image data, in response to a user's operation; a history creating device that creates a history information that, for each image data, indicates a history of image processing performed by the image processing device; and a display unit that displays the history information thus created.

According to a 9th aspect of the present invention, the digital camera according to the 8th aspect may further include an image processing selection device that specifies image processing to be performed to the image data and its sequence to be performed prior to a photographing operation, and the image processing device may perform image processing, following a content that is specified with the image processing selection device.

A computer-readable computer program product containing a control program for image processing according to a 10th aspect of the present invention, the control program including: instructions for performing image processing to image data; instructions for creating a history information that, for each image data, indicates a content of the image processing performed to the image data, and, in case of a plurality of image processing having been performed, its sequence; and instructions for displaying the history information thus created.

According to a 11th aspect of the present invention, in the computer-readable computer program product according to the 10th aspect, the computer-readable computer program product may be a recording medium on which the control program is recorded.

According to a 12th aspect of the present invention, in the computer-readable computer program product according to the 10th aspect, the computer-readable computer program product may be a carrier wave in which the control program is embodied as a data signal.

A method for image processing according to a 13th aspect of the present invention: performs image processing to image data; creates, for each image data, a history information that indicates a content of the image processing performed to the image data, and, in case of a plurality of image processing having been performed, its sequence; and displays the history information thus created.

DESCRIPTION OF PREFERRED EMBODIMENTS

An embodiment of the invention will be described with reference to FIGS. 1 to 8.

Figure 1:
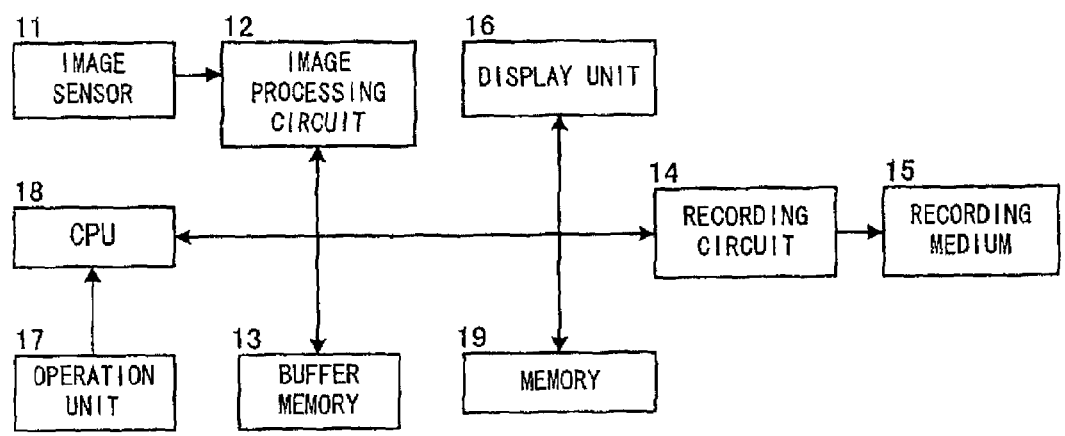
FIG. 1 is a control block diagram of a digital camera in one embodiment of the present invention.

FIG. 1 is a block diagram of a digital camera in the embodiment. A light flux of a subject that transmitted a lens (not figured herein) is photoelectrically converted with an image sensor 11, which is constituted of, for example, a CCD or CMOS sensor. With regard to an image signal that is an output of photoelectric conversion of the image sensor 11, a variety of processes are performed in an image processing circuit 12 and image data is generated. The image data is temporarily stored in a buffer memory 13, and then stored as an image file on a recording medium 15 such as a memory card, etc., via a recording circuit 14. The image file is in a computer-readable format, and usually includes additional information (such as an Exif information) other than image data. The recording medium 15 can be inserted into and ejected from the digital camera via a slot, which is not figured herein, of the digital camera. Otherwise, a built-in memory embedded in the digital camera can be used as a recording medium.

A display unit 16 includes a liquid crystal display (LCD) monitor which is, for example, disposed at a back of the digital camera and its drive circuit, to allow an image display and a menu display. An operation unit 17 includes various operation members, such as a release button and various operation buttons used on the playback mode as to be hereinafter described, as well as switches that are interlocked to those operations. A CPU 18 executes operations based on programs stored in a memory 19 and drive-controls foregoing each circuit and device based on an input from the operation unit 17.

Figure 2:
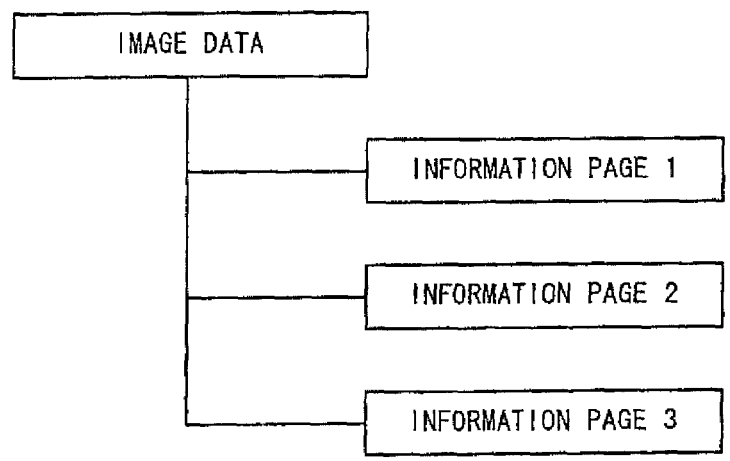
FIG. 2 is a figure that illustrates a pattern diagram which shows image data and information page created, being associated with the image data.

The digital camera has two operation modes: a shooting mode for photographing, and a reproducing mode for reproducing photographed image data. In a reproducing mode can read out image data stored in the recording medium 15, and can display a subject image based on the image data on the display unit 16. On that occasion, a variety of information can be displayed, superimposing on the subject image. As illustrated in FIG. 2, to each image data, information page 1 and 2 to be displayed are allocated automatically. And, in case image processing described below has been performed in response to a user's operation, information page 3 is added.

Figure 3:
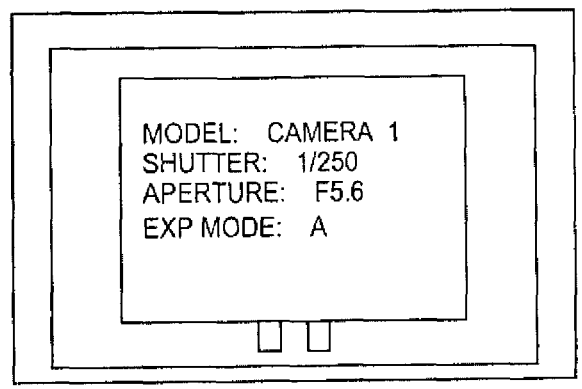
FIG. 3 is a figure that illustrates a display example of information page 1 being selected.
Figure 4:
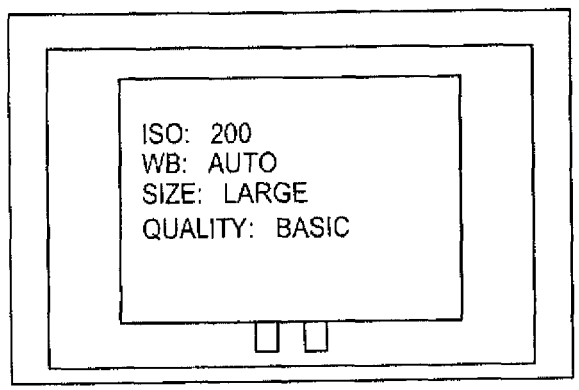
FIG. 4 is a figure that illustrates a display example of information page 2 being selected.

When information page 1 is selected, as FIG. 3 illustrates, a model of a camera, a shutter speed of photographing the image, a value of an aperture of photographing the image, and an exposure mode of photographing the image are displayed, superimposing on a subject image. When information page 2 is selected, as FIG. 4 illustrates, an ISO speed, a white balance setting, a size of an image, and a quality of an image are displayed, superimposing on a subject image. Each item of information displayed in information page 1 and 2 is information that is recorded on the above described additional information: for example, information of a digital camera itself, photographing information at the time of shooting, and so on.

Next, an image processing to a recorded image and information page 3 is described.

As described above, the digital camera performs the prescribed image processing to an image signal that was obtained by photographing, and records processed image data on the recording medium 15. Apart from that, the digital camera can read out image data which was once recorded on the recording medium 15, perform the image processing as a user likes, and re-record the data. In description hereinafter, unless otherwise noted, "image processing" refers to the processing to the recorded image data.

With regard to a selectable image processing, there are a tone correction, a white balance control, a color conversion (monochromatize), a trimming, a red eye correction, a distortion correction, a noise removal, an image size reduction, and so forth. It is also possible to perform a plurality of processing to one single image data. However, selectable image processing will not be limited to those mentioned above.

In case of performing a plurality of image processing to recorded image data, there might be a concern that a user becomes confused what kind of image processing has been performed. Therefore, in the embodiment, it is allowed to create a history of image processing as information page 3, and display it together with a subject image.

Figure 5:
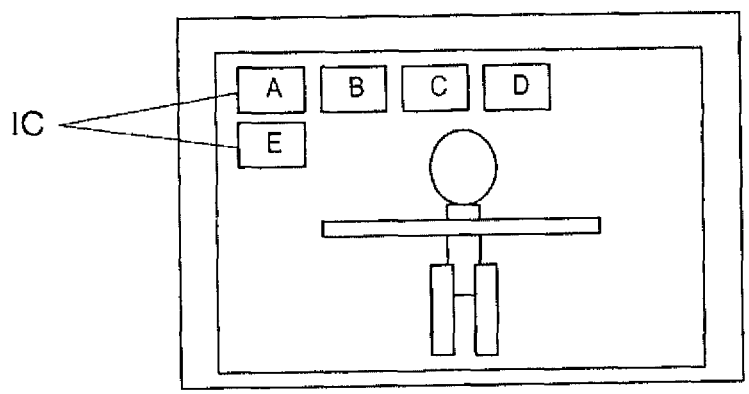
FIG. 5 is a figure that illustrates a display example of information page 3 being selected.

FIG. 5 illustrates an example of displaying a content of information page 3, superimposing on a subject image. It is an example of displaying with icons IC image processing that have been performed. This illustrates that 5 types of image processing have been performed in ABODE order with each icon IC employing a design that features a content of the corresponding processing.

Figure 6:
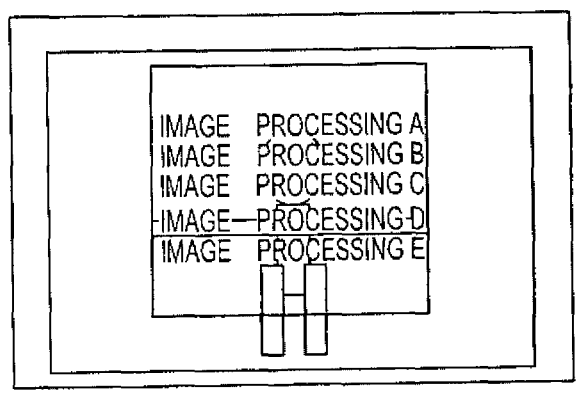
FIG. 6 is a figure that illustrates another display example of information page 3 being selected.

FIG. 6 illustrates an example of a case of displaying a process using text in substitution for the icons IC, and illustrates that the process has been performed from a top to a bottom. It is to be noted that "Image Processing A", "Image Processing B", etc. are to be replaced with actual process names. With regard to embodiment of FIG. 5 and FIG. 6, either of these is allowed: to employ either one of those figures, or to configure with both of those figures so that a user can choose one according to his or her preference.

Using a prescribed operation for information display setting with, for example, the operation unit 17, a user can switch information to be displayed in order from "No Information", "Information Page 1", "Information Page 2", to "Information Page 3 (if any)", to each displayed image. Information Page 1 to 3 can be saved as an additional information included in an image file; otherwise, can be saved apart from the image file.

Thus, with regard to recorded image data, now that history information of image processing is related to each image data as Information page 3, and can be displayed with a subject image; therefore, on an occasion of an image display, it is convenient that an existence of the image processing, type and sequence of the image processing to the image data are shown at a glance.

Figure 7:
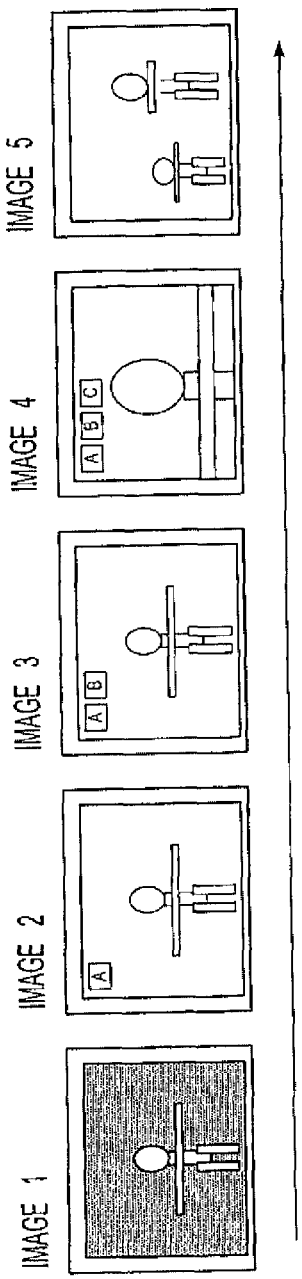
FIG. 7 is a figure that illustrates a display example of a frame-by-frame advance.

FIG. 7 is an example of a display with frame-by-frame advance. Displayed images are switched in sequence with each prescribed operation of frame-by-frame advance, using, for example, the operation unit 17. It is allowed to switch images sequentially from a new image to an old image with, for example, a forward operation; meanwhile, switch them backward with a backward operation. In case of image data having information page 3, with regard to frame-by-frame advance, information page 3 is always displayed together with the image, regardless of an information display setting at the time. That is to say, a subject image to which image processing has been performed in response to a user's operation after it was recorded on the recording medium 15 is always displayed together with history information of the image processing on frame-by-frame advance. Thereafter, information to be displayed can be switched, using the foregoing operation for information display setting.

However, it is allowed to display information, following an information display setting at the time, in substitution for the control of displaying information page 3 regardless of an information display setting. For example, in case of a setting to display information page 1, information page 1 is displayed even though image data which has information page 3 is selected on frame-by-frame advance. On this occasion, if a user prefers to display information page 3, the user can perform the foregoing operation for information display setting. In addition, the user can be allowed to select either setting: the setting of displaying information page 3 regardless of an information display setting, or the setting of displaying information following an information display setting. The selection can be made on, for example, a custom setting screen.

In the example of FIG. 7, one to three types of the image processing are performed to image 2 to 4 respectively; meanwhile, any image processing is not performed to image 1 and 5. Image 2 is an image on which image processing A (for example, a tone correction) is performed to image 1 that is an original subject image. Image 3 is an image on which image processing B (for example, a color tuning) is performed to image 2. Image 4 is an image on which image processing C (for example, a trimming) is performed to image 3. Thus, in the embodiment, every time one single image processing is performed, new image data is recorded separately; therefore, a user can compare images of before and after the processing, can recognize clearly an effect of the image processing, and can undo and redo as the user likes. Also, the image data can be overwritten in substitution for being recorded separately.

Figure 8:
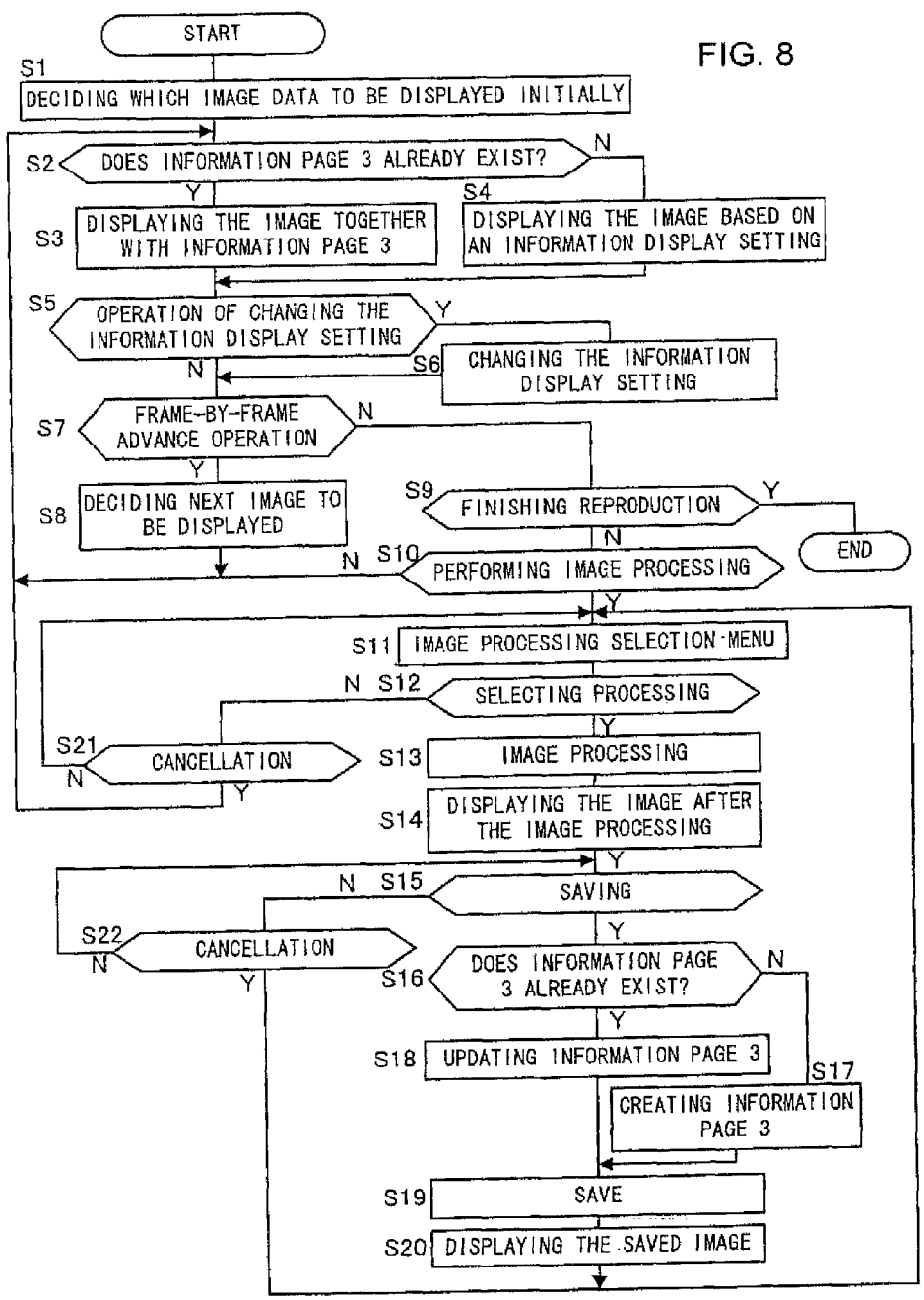
FIG. 8 is a flow chart that illustrates a processing procedure of a reproducing mode.

FIG. 8 shows a flow chart which illustrates a procedure of processing for executing the foregoing image processing and its history display. This processing is executed in a CPU 18, following a program stored in the memory 19.

Once a reproducing mode is set, then the CPU 18 runs the program and it is decided which image data is to be displayed initially at a step S1. For example, among image data recorded on the recording medium 15, most recently photographed image data is designated as a first image data to be displayed. At a step S2, it is determined whether or not information page 3 already exists with respect to the image data to be displayed. In case information page 3 exists, then the operation proceeds to a step S3 and displays a subject image based on the image data to be displayed, together with information page 3. In case information page 3 does not exist, then the operation proceeds to a step S4 and displays an image based on an information display setting at the time (either "No Information", "Information Page 1", or "Information Page 2").

At a step S5, it is confirmed whether the above described operation for information display setting has been performed or not. If the operation for information display setting has been made with respect to the image data that is currently displayed, then the information display setting is changed at a step S6 depending upon the operation. At a step S7, it is determined whether a frame-by-frame advance operation has been performed or not. In case the frame-by-frame advance operation has been made, then the operation proceeds to a step S8 in which next image data to be displayed is decided before returning to a step S2. In case any frame-by-frame advance operation has not been performed, then the operation proceeds to a step S9 to confirm an operation for finishing reproduction. In case the operation for finishing reproduction is confirmed, then the processing of FIG. 8 ends, whereas incase the operation for finishing reproduction is not confirmed, then the operation proceeds to a step S10.

At the step S10, it is determined whether or not image processing will be performed to the currently displayed image data. When a user performs an operation for commanding an image processing to be performed, then the operation proceeds to a step S11 to display an image processing selection menu. On the image processing selection menu displays a list of the foregoing selectable image processing. And, the user can select any image processing by a prescribed selection operation using the operation unit 17. In case the user does not select any image processing at a step S12, the operation proceeds to step 21. If the user performs a cancellation operation at step 21, then the operation returns to the step S2, whereas in case the user does not perform the cancellation operation, then the operation returns to the step S11. If the user selects any image processing at the step S12, the operation proceeds to a step S13. At the step S13, the selected image processing is performed to the currently displayed image data with the image processing circuit 12.

At a step S14, a subject image based on the image data after the image processing is displayed. At a step S15, the user is asked whether or not the user wishes to save the image data after the image processing. In case the image data is not to be saved, then the operation proceeds to a step S22. If the user performs a cancellation operation at the step S22, then the operation returns to the step S11; meanwhile, in case the user does not perform the cancellation operation, then the operation returns to the step S15. If the user orders to save the image data at the step S15, then the operation proceeds to a step S16. At the step S16, it is confirmed whether information page 3 to the image data already exists or not. In case information page 3 does not exist, the operation proceeds to a step S17 and creates information page 3 to write a content of the image processing performed this time (a name of the image processing) as history information. In case information page 3 already exists, the operation proceeds to a step S18 and adds the content of the image processing of this time on information page 3 to update the history information.

At a step S19, the image data after the image processing is recorded together with information page 3, on the recording medium 15, apart from the image data before the image processing. At a step S20, the recorded image data is displayed together with information page 3, and then the operation returns to the step S11.

Although it is not explained in the flow chart of FIG. 8, however, there is an image selection method of selecting an image to be displayed from a plurality of thumbnail images. To image data that is selected by the method, too, the process of foregoing step S3 to S6, the step S10 and those after the step S10 can be applied likewise.

Thus, with performing the image processing and the processing of history display, it becomes easy to recognize a content of the image processing afterward, in case the image processing has been performed to the image data. In particular, it is effective in case a plurality of image processing have been performed to a certain image data. In case a plurality of image processing different from each other have been performed to the certain image data, there can be a case of which different sequence of a plurality of image processing result in different image processing consequence. There can be the case of which the image data that is obtained after the image processing is different from each other; for example, between in case of performing the image processing in sequence from image processing A, image processing B, to image processing C, and in case of performing the image processing in sequence from the image processing A, the image processing C, to the image processing B. Whereat, by displaying type and sequence of the image processing, the user is enabled to recognize easily what type of image processing have been performed in what sequence.

Although an example of displaying a history information (information page 3) with superimposing on a subject image has been described thus far, but it is also allowed to display the history information in a display area other than that of the subject image in a display screen of the display unit 16. And, even without displaying the subject image itself, it is also possible to display only the foregoing history information when its image data is selected.

And, although image processing to recorded image data has been described thus far, but it is also allowed to perform image processing which a user likes, to image data before being recorded on the recording medium 15. To embody what described above, the foregoing image processing selection menu is displayed prior to a photography operation (an operation of pushing the release button), in order to allow the user to select image processing. In an image processing selection, a plurality of image processing are allowed to be selected, and sequence of performing the image processing are allowed to be specified as well. Once a photography operation is performed, the digital camera captures an image, performs the foregoing selected image processing to an image signal in specified sequence, and generates and records the image data. Also in this case, information page 3, as the history information of the image processing, is created, and can be displayed together with the subject image, in a reproducing mode.

Figure 9:
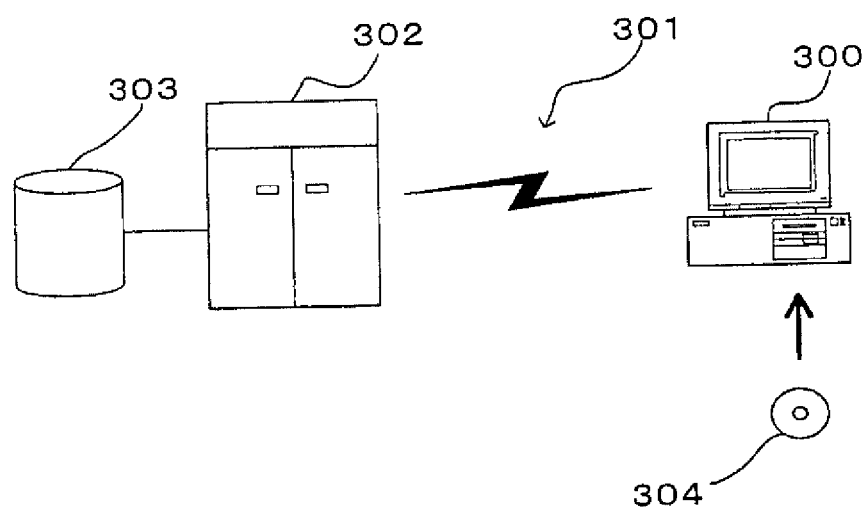
FIG. 9 is a figure that illustrates a control program for image processing being provided through a recording medium and a data signal such as an Internet.

And, in case of applying to a personal computer, a program which is related to control of the foregoing image processing and the history display can be provided through a recording medium such as a CD-ROM or a data signal such as an Internet. It is explained with reference to FIG. 9. A personal computer 300 is provided with a program via a CD-ROM 304. And, the personal computer 300 has a function to connect with a communication line 301. A computer 302 is a server computer that provides the foregoing program, and stores the program on a recording medium such as a hard disk 303, etc. The communication line 301 includes the Internet, communication lines like a PC communication, a dedicated communication line, etc. The computer 302 reads out the program from the hard disk 303, and send the program to the personal computer 300 via the communication line 301. That is to say, the computer 302 embodies the program on a carrier wave as the data signal, and sends the program via the communication line 301. Thus, the program can be provided as a computer-readable computer program product with various forms such as the recording medium and the data signal embodied in the carrier.

And, with a personal computer, the foregoing image processing and the history display process can be performed to image data other than the subject image photographed with a digital camera.

The above described control that is related to image processing can be embodied in electronics devices that deal with image data other than a digital camera, such as a photo storage, etc., in which images are stored.

The above-described embodiments are examples, and various modifications can be made without departing from the scope of the invention.

What is claimed is:

1. A digital camera comprising:
   an imaging device that photographs a subject and generates image data;
   a recording device that records the image data, in which predetermined image processing has been performed, on a recording medium;
   an image processing device that performs, on the image data that has been read from the recording medium, image processing selected by a user from among a plurality of different types of image processing processes that can be arbitrarily selected by the user as the image processing to be performed on the image data that has been read from the recording medium;
   a history information creating device that creates history information that indicates (i) a type and (ii) a sequence of the plurality of different types of image processing processes that have been sequentially performed by the image processing device to the image data that has been read from the recording medium; and
   a display device that displays on a screen: (1) an image based on the image data which was read from the recording medium and to which the plurality of different types of image processing processes have been sequentially performed by the image processing device, and (2) image processing information that indicates (i) the type and (ii) the sequence of the plurality of different types of image processing processes that have been sequentially performed by the image processing device to the image data that has been read from the recording medium based on the history information created by the history information creating device.

2. The digital camera as set forth in claim 1, wherein a state in which the image processing information is displayed along with the image on the display device can be switched to (i) a state in which only the image is displayed on the display device, or (ii) a state in which information on a shooting condition of the image data corresponding to the image is displayed along with the image on the display device.

3. The digital camera as set forth in claim 1, wherein the display device displays (i) both the image and the image processing information of the plurality of different types of image processing processes that are sequentially performed on the image data corresponding to the image displayed on the display device, or (ii) only the image on the display device, or displays both the image and information on a shooting condition of image data corresponding to the image, if image processing is not performed on the image data corresponding to the image displayed on the display device.

4. The digital camera as set forth in claim 1, wherein the display device displays the image processing information on the screen by an icon.

5. The digital camera as set forth in claim 1, wherein the display device superimposes the image processing information on the image and displays both the image and the image processing information on the screen.

6. The digital camera as set forth in claim 1, wherein the recording medium is detachable from the digital camera.

7. The digital camera as set forth in claim 1, wherein the image data comprises a single image of the subject, and wherein the history information indicates (i) the type and (ii) the sequence of the plurality of different types of image processing processes that have been sequentially performed by the image processing device to the single image of the subject.

8. The digital camera as set forth in claim 1, wherein the plurality of different types of image processing processes applied to the image data includes any one or more from the group comprising a tone correction, a white balance control, a color conversion, a trimming, a red eye correction, a distortion correction, and a noise removal, and wherein the history information creating device that creates the history information that indicates (i) the type and (ii) the sequence of the plurality of different types of image processing processes selected by the user from the group that have been sequentially performed by the image processing device to the image data that has been read from the recording medium.

9. A non-transitory computer readable medium that stores a program that, when executed by a computer, performs the steps of:

performing predetermined image processing on image data and recording the image data in which the predetermined image processing has been performed on a memory;

performing, on the image data that has been read from the memory, image processing selected by a user from among a plurality of different types of image processing processes that can be arbitrarily selected by the user as the image processing to be performed on the image data that has been read from the memory;

creating history information that indicates (i) a type and (ii) a sequence of the plurality of different types of image processing processes that have been sequentially performed to the image data that has been read from the memory; and displaying, on a screen, (1) an image based on the image data which was read from the memory and to which the plurality of different types of image processing processes have been sequentially performed, and (2) image processing information that indicates (i) the type and (ii) the sequence of the plurality of different types of image processing processes that have been sequentially performed to the image data that has been read from the memory based on the created history information.

* * * * *